United States Patent [19]

Haslbeck et al.

[11] 4,315,100
[45] Feb. 9, 1982

[54] ELECTRICAL BOX

[75] Inventors: Joseph Haslbeck, West Vancouver; Allan Liggins, Coquitlam, both of Canada

[73] Assignee: Highland Manufacturing Company, Ltd., Burnaby, Canada

[21] Appl. No.: 100,934

[22] Filed: Dec. 6, 1979

[51] Int. Cl.³ .............................................. H02G 3/08
[52] U.S. Cl. ...................................... 174/51; 174/53; 220/3.2
[58] Field of Search ........................... 174/51, 53; 220/3.2–3.94; 85/32 V, 33, 36, 85; 151/41.74, 41.75, 41.76

[56] References Cited

U.S. PATENT DOCUMENTS

| | | | |
|---|---|---|---|
| 3,210,458 | 10/1965 | Palmer | 174/51 |
| 3,352,341 | 11/1967 | Schertz | 85/33 X |
| 3,876,821 | 4/1975 | Pringle | 174/53 |
| 4,071,158 | 1/1978 | 220 | 3.2/ |
| 4,130,335 | 12/1978 | Kinney | 339/122 R |

Primary Examiner—Gene Z. Rubinson
Assistant Examiner—D. A. Tone
Attorney, Agent, or Firm—Fulwider, Patton, Rieber, Lee & Utecht

[57] ABSTRACT

An electrical box adapted to receive an electrical fitting. There are openings formed in the box to align with openings formed in the fitting. Separate threaded portions are positionable within the openings and can move apart upon insertion of a screw. But the threaded portion grips the screw when the screw is rotated. The speed of installation is greater than is possible with prior art boxes.

7 Claims, 9 Drawing Figures

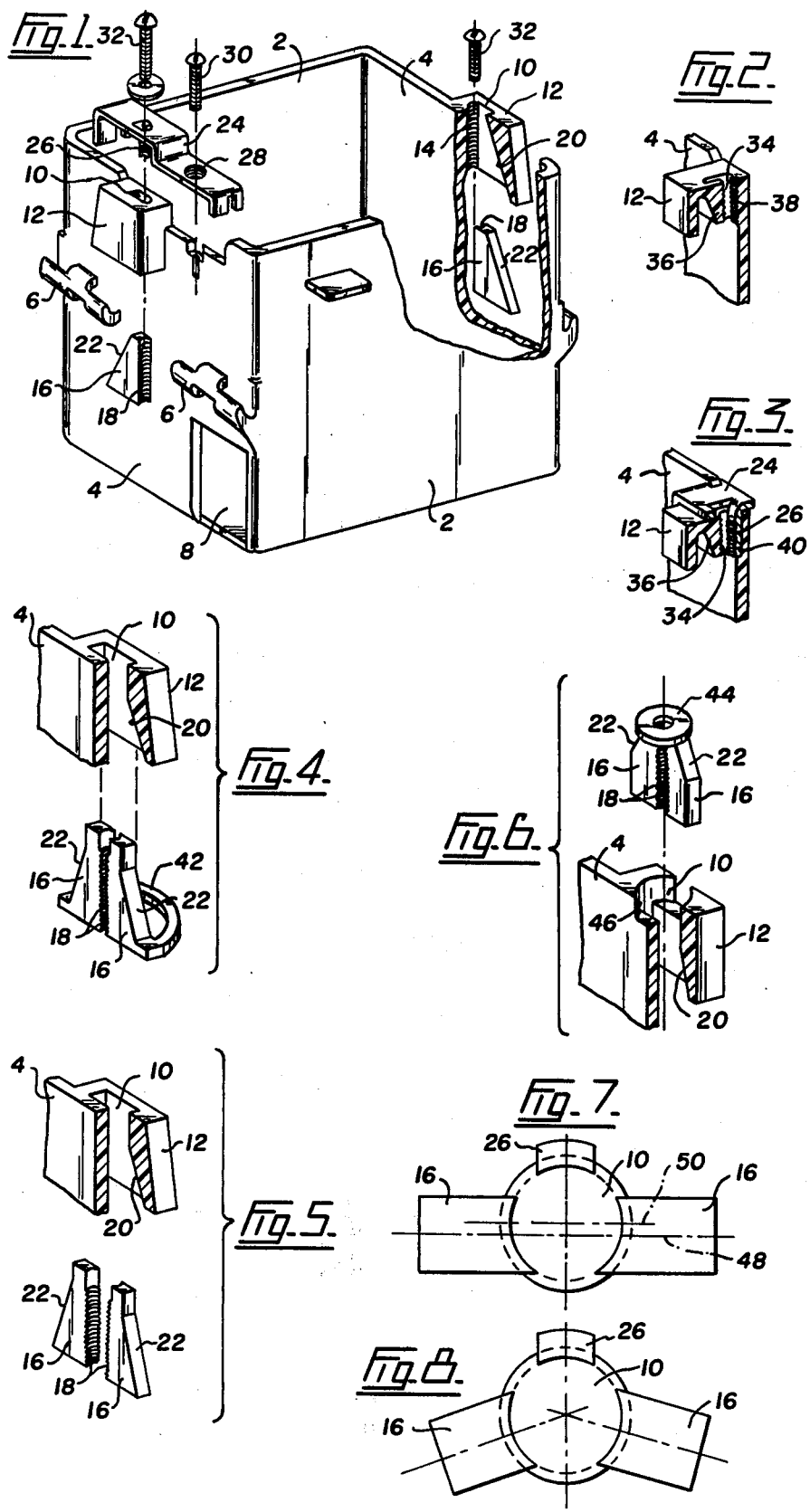

ELECTRICAL BOX

FIELD OF THE INVENTION

This invention relates to an electrical box, more particularly to a box having novel means for mounting the electrical device, for example a switch or an outlet, to be located in the box.

DESCRIPTION OF PRIOR ART

Electrical boxes are well known in the art. They are positioned where, for example, an outlet or a switch is required. The cable of an electrical circuit leads into the box and is attached to the switch or outlet in the box. The box is provided with location means for the switch or outlet and with means to attach the box to the structure of a building. Provision for grounding is also usually provided, referred to generally as ground straps in this specification. Such straps are required under the Canadian regulations but not always under the U.S. regulations.

A relatively recent trend in electrical boxes is their manufacture from plastic. Such a box is typically made from thermoplastic resins with flame retarding agents incorporated. But the use of thermosetting resins is also known.

Typically the fitting to be located in the box has been located by the provision of lugs at each end of the box having threaded openings to align with clear openings in the fitting. To install the fitting the openings in the fitting and in the lugs are aligned and a screw is screwed into the thread in the lug to locate the fitting in position in the box. The formation of threaded lugs in plastic boxes is not always desirable. It can be economically undesirable to make the plastic box of a resin ideal for the formation of threads.

Furthermore, at least from a commercial point of view, the installation of the fitting into the box can be time consuming.

Fast mount threads are known. For example U.S. Pat. No. 3,955,463 issued May 11, 1976 to Slater describes and claims a screw mounting clip that can be useful in the fastening of an electrical fitting in an electrical box. The arrangement in the Slater patent is the provision of a flat clip received in a slot and including a yieldable pawl arm.

The above clip has the disadvantage that the moulding of the box is quite difficult in that there must be provided a number of narrow slots in order to provide proper location for these clips. Furthermore it has been found that the device is difficult to torque properly; it tends to slip. The relevant United States standard is that the screw must be able to withstand a torque of 12 inch pounds. Although the screw may slip any slipping that occurs must not damage the location. However, there is a proposed Canadian Standard that requires that the device be located with a torque of 12 inch pounds for switch boxes and 20 inch pounds for ceiling boxes and no slip is permitted. A further disadvantage is that the above clip is not entirely satisfactory for the accommodation of ground straps.

SUMMARY OF THE INVENTION

The present invention provides an electrical box having a quick mounting thread that avoids the above disadvantages. In a preferred aspect the present invention is an electrical box adapted to receive an electrical fitting; openings formed in the box to align with openings formed in the fitting; separate threaded portions positionable within the openings and adapted to be moved apart upon insertion of a screw but to grip the screw when the screw is rotated.

As in the prior art the openings are preferably formed in the box in projections or lugs at the end of the box.

In one embodiment the openings have one threaded portion formed integral with the interior of the opening and a separate threaded member receivable within the opening. The opening may be provided with an inclined surface and the separate threaded member has a corresponding inclined surface, remote from its thread.

In another embodiment both the threaded portions may be formed integral with the opening. One threaded portion comprises a resilient member formed within the opening, the other member is relatively rigidly formed.

In a further embodiment the box may include a ground strap and one threaded portion is a threaded projection on the ground strap that extends into the opening. The second threaded portion is formed on a resiliently mounted member.

In a further aspect the threaded portions are each formed separately from the box and positionable with their threads opposed to each other.

BRIEF DESCRIPTION OF THE DRAWINGS

Aspects of the invention are illustrated, merely by way of example, in the accompanying drawings, in which:

FIG. 1 is a view of an electrical box according to the present invention;

FIG. 2 illustrates a variation of the box of FIG. 1;

FIG. 3 illustrates a further variation;

FIG. 4 is an exploded view of a further variation;

FIG. 5 is an exploded view of a further variation;

FIG. 6 illustrates a further variation;

FIG. 7 illustrates a desirable arrangement for the location of a ground strap;

FIG. 8 illustrates a further desirable means of locating a ground strap; and

DESCRIPTION OF THE PREFERRED EMBODIMENTS

Figure 9:
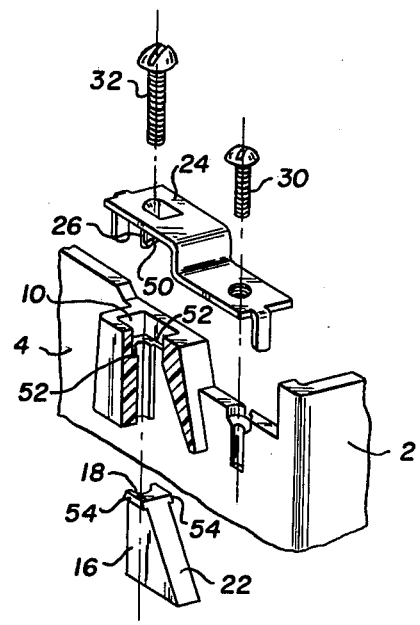
FIG. 9 illustrates a further variation of the box of FIG. 1.

FIG. 1 illustrates an electrical box having side walls 2 and end walls 4. There are means for locating the box in position in a building. The means illustrated in the box of FIG. 1, which do not form part of the invention, comprise integrally molded channels 6 to receive a nail. There is an opening 8 into the box so that cable may be led into the box. Typically clamping means will be associated with the opening 8 although such means are not illustrated in the drawings.

There are openings 10 formed in lugs 12 molded integrally with the end walls 4 of the box. In the embodiment illustrated in FIG. 1 one portion of the opening 10 is formed with an integral thread 14, shown to the right of FIG. 1. There is a separate insert 16 with a thread 18 (shown more clearly to the left of FIG. 1) to oppose the integral thread 14. The opening 10 is formed with an inclined surface 20 and the insert 16 is formed with a corresponding inclined surface 22.

The box of FIG. 1 has a ground strap 24 shown at the left. The ground strap 24 has a projection 26 formed with a segment of a thread. That thread projects downwardly into the opening 10. Strap 24 is also provided with a threaded opening 28 in which the ground wire (not shown) is attached by screw 30 in conventional manner. There are locating screws 32 for the fitting (not shown) located within the box.

To install a fitting within the electrical box of FIG. 1 screws 32 are removed. The fitting is positioned in the box with the usual clear holes at its ends located over the openings 10. The inserts 16 are positioned within the openings 10 in the lugs 12, usually in the factory so that the box is ready for use. The screws 32 are then pushed between the threads 14 and 18. The screws 32 may then be tightened, typically by about two turns, and the proper location of the device is achieved.

FIG. 2 merely shows a detail of an electrical box. It shows a part of one end wall 4 of the box and part of a lug 12 attached to that wall 4. In the embodiment of FIG. 2 there are two threaded portions, each integral with the lug 12. One threaded portion 34 is mounted on a resilient member 36 formed within the opening 10. The other thread 38 is relatively rigidly formed. The arrangement is such that when a screw 32 is pushed into the opening 10 the resilient member 36 resiles away from the screw 32 as by ratchet action. Turning of the screw 32 however ensures the necessary tightening as in the embodiment of FIG. 1.

FIG. 3 illustrates a variation of the embodiment of FIG. 2 in that a ground strap 24 is again used. In this case the threaded projection 26 is located within a recess 40 formed within the opening 10 in the lug 12. The same resilient member 36 is present but the thread 38 shown in FIG. 2 is replaced by the thread on the projection 26 on the ground strap 24.

FIG. 4 illustrates an embodiment in which there are two threaded inserts 16 each formed separately from the box but joined to each other by an arcuate member 42.

FIG. 5 illustrates what may be considered development of the FIG. 4 embodiment. The opposed threaded insert members 16 are not joined to each other but are formed entirely separately both from themselves and from the box.

FIG. 6 illustrates an embodiment of the invention particularly adapted to be inserted from the top of the box. In this embodiment the threaded inserts 16 are molded integrally with a circular or other conveniently shaped flange 44 that abuts a recess 46 formed at the top of the lug 12.

The embodiments of FIGS. 4, 5 and 6 all feature sloped walls 22 on a threaded insert 16 and correspondingly sloped walls 20 on the openings 10 in the lugs 12.

FIGS. 7 and 8 are included to illustrate particular arrangements of the inserts 16 to ensure that good electrical contact is made between the metal locating screw 32 and the ground strap projection 26. In both arrangements, the inserts 16 are arranged asymmetrically. Thus in FIG. 7 the longitudinal axis 48 of the aligned, threaded inserts 16 is spaced from the diameter 50 of the opening 10 in the lug 12. The effect is that when a screw 32 is screwed into position it tends to be forced into good contact with the projection 26 of the ground strap 24.

In FIG. 8 the arrangement is similar except that the threaded inserts are angled.

FIG. 9 illustrates the ground strap projection 26 turned through 90° relative to the position shown in FIG. 1. More importantly the projection 26 is turned with a single, inclined ridge 50 replacing the plurality of threads shown in FIG. 1. A further desirable feature shown in FIG. 9 is that the opening 10 is formed with ledges 52 and corresponding shoulders 54 are formed on the inserts 16. This ensures that when the inserts 16 are positioned within the openings 10 in the factory they remain in place. The dimensions of the shoulders 54 are such that they can be forced upwardly into the opening 10 but expand to rest on ledges 52, which prevents easy removal of the insert 16.

The box of the present invention will meet the standards required by both the U.S. and Canadian Authorities. It is has passed CSA's proposed new standards for the elevated temperature pull out test. This proposed test requires an outlet box to be mounted face down and with a fitting, switch or outlet, supported with screws. A weight of 40 pounds is suspended for a period of 24 hours in an air circulating oven at a temperature of 80° for wall boxes and 105° C. for ceiling boxes.

A particular feature of the boxes is that the plastic inserts 16 having the threads formed on them need not, particularly in the embodiments of FIGS. 4 to 6, be formed of the same resin as the remainder of the box. Desirable characteristics for a resin suitable for a box are not necessarily desirable characteristics for a resin in which a thread is to be formed. Nylon inserts have proved desirable for the threaded members because of the good structural strength of nylon. Further one size of insert can be made to accommodate both screw sizes in common use, i.e. 6–32 for wall boxes and 8–32 for ceiling boxes as both diameter screws have the same number of threads per inch, 32.

We claim:
1. An electrical box adapted to receive an electrical fitting;
   openings formed in the box to align with openings formed in the fitting;
   a ground strap;
   threaded portions within each opening and adapted to move apart upon insertion of a screw but to grip the screw when the screw is rotated;
   one threaded portion being a threaded projection on the ground strap, the threaded projection on the ground strap extending into one of said openings in the box;
   a second threaded portion in said one of said openings being formed on a resiliently mounted member.
2. An electrical box as claimed in claim 1 in which the openings in the box are formed in projections at ends of the box.
3. An electrical box adapted to receive an electrical fitting;
   openings formed in the box to align with openings formed in the fitting;
   separate threaded portions positionable within the openings and adapted to be moved apart upon insertion of a screw but to grip the screw when the screw is rotated;
   the separate threaded portions being positionable with their threads opposed to each other;
   a ground strap;
   a threaded projection extending from the ground strap into the opening, the threaded portions being arranged assymmetrically to force the screw against the ground strap projection.
4. A box as claimed in claim 3 including at least one ledge formed in the opening, a corresponding shoulder formed on the threaded member to engage the ledge to hold the threaded member within the opening.
5. An electrical box;

lugs formed at the top of opposed ends of the box;
an opening in each lug;
opposed walls formed within the opening, one wall formed with a thread the other sloping outwardly downwardly;
an insert adapted to be positioned in each opening;
a threaded wall portion formed on each insert;
a sloped wall formed on each insert, remote from the thread to abut the correspondingly sloped wall of an opening;
a ground strap;
a threaded projection on the ground strap extending into an opening to engage a screw;
whereby, with the insert in position in the opening, a screw may be inserted between the insert and the one wall of the opening formed with a thread to be gripped between the threaded portions upon tightening and to engage the ground strap projection.

6. A box as claimed in claim 5 in which the threads in each opening are arranged on opposite sides of a diameter of the opening from the ground strap projection so that the screw is forced into contact with the ground strap projection on tightening.

7. A box as claimed in claim 5 in which there is at least one ledge formed in each opening;
a corresponding shoulder formed on each insert to engage the ledge to assist in retaining the insert within an opening.

* * * * *